(12) United States Patent
Noguchi

(10) Patent No.: US 7,422,689 B2
(45) Date of Patent: Sep. 9, 2008

(54) MEMBRANE-CLEANING METHOD FOR MEMBRANE BIOREACTOR PROCESS

(75) Inventor: Motoharu Noguchi, Handa (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 11/769,945

(22) Filed: Jun. 28, 2007

(65) Prior Publication Data

US 2008/0105615 A1     May 8, 2008

Related U.S. Application Data

(63) Continuation of application No. PCT/JP2005/003131, filed on Feb. 25, 2005.

(51) Int. Cl.
   *C02F 3/00* (2006.01)
(52) U.S. Cl. ...................... 210/631; 210/355
(58) Field of Classification Search ............... 210/631, 210/355
   See application file for complete search history.

(56) References Cited

U.S. PATENT DOCUMENTS 5,180,402 A * 1/1993 Kubota et al. .................. 8/490

FOREIGN PATENT DOCUMENTS

| JP | 54-032181 A1 | 3/1979 |
|---|---|---|
| JP | 56-024005 A1 | 3/1981 |
| JP | 61-021789 A1 | 1/1986 |
| JP | 02-043994 A1 | 2/1990 |
| JP | 02-122892 A1 | 5/1990 |
| JP | 05-115899 A1 | 5/1993 |
| JP | 05-339115 A1 | 12/1993 |
| JP | 05-339809 A1 | 12/1993 |
| JP | 09-136021 A1 | 5/1997 |
| JP | 11-197685 A1 | 7/1999 |
| JP | 11-309477 A1 | 11/1999 |
| JP | 2000-084378 A1 | 3/2000 |
| JP | 2001-062477 A1 | 3/2001 |
| JP | 2001-104980 A1 | 4/2001 |
| JP | 2001-205285 A1 | 7/2001 |
| JP | 2002-113484 A1 | 4/2002 |
| JP | 2002-191361 A1 | 7/2002 |
| JP | 2002-263673 A1 | 9/2002 |
| JP | 2005-074357 A1 | 3/2005 |

* cited by examiner

*Primary Examiner*—Chester T. Barry
(74) *Attorney, Agent, or Firm*—Burr & Brown

(57) ABSTRACT

A method of cleaning a membrane in a membrane separation activated-sludge process. By the method, deposits adherent to the surface of a membrane used in a membrane separation activated-sludge process can be effectively scratched off and the membrane filtration rate can be prevented from decreasing. Membrane-cleaning particles (4) in which the surface to be in contact with the water to be treated has been hydrophilized and has a surface roughness of 100-2,500 μm are introduced into a bioreactor (1). The particles are caused to flow by the lifting effect of air bubbles ejected from an aerator (3) or by the fluidizing effect of a fluidizing means to thereby cause the particles to scratch off deposits adherent to the surface of a separation membrane element (2). In one embodiment, membrane-cleaning particles (4) which are non-porous or have closed cells are used. In another embodiment, membrane-cleaning particles (4) having an antibacterial ingredient, such as copper or silver, supported on the surface or in inner parts thereof are used. In a still another embodiment, the membrane-cleaning particles (4) are periodically brought into an anaerobic condition to remove microorganisms from the particle surface.

5 Claims, 1 Drawing Sheet

MEMBRANE-CLEANING METHOD FOR MEMBRANE BIOREACTOR PROCESS

TECHNICAL FIELD

The present invention relates to a membrane-cleaning method for a membrane bioreactor process used in wastewater treatment in sewage treatment plants.

BACKGROUND OF THE INVENTION

When organic wastewater is treated by activated sludge-process, a method of providing a settling tank behind a biological reaction tank, and of settlement-separating sludge and filtrate, is normal. However, since for such a method a large scale settling tank is required, in for example, sewage treatment plants in cities where sizes of site are necessarily limited, a membrane bioreactor process is being studied of arranging a separation membrane element in the interior of a reaction tank, of performing solid-liquid separation, and of taking out treated liquid as membrane-filtered water. This method makes a large-scale settling tank unnecessary.

However, in the membrane bioreactor process, a danger arises that sludge will deposits adherent to a surface of a separation membrane, and that within a short space of time the rate of a filtration through the membrane will deteriorate. Then, as shown in Patent Literature 1, a method has been provided of arranging an air-ejecting nozzle below a separation membrane element, of introducing a floating solid into a biological reaction tank, or causing the floating solid to flow by means of the lifting action of bubbles from the air-ejecting nozzle, and of scraping off the deposits adherent to the separation membrane surface. In the invention described in this Patent Literature 1, as the floating solid, a spongy foaming resin has been used.

However, in a conventional spongy floating solid, bubbles are gradually generated in communicating pores in the interior thereof, and, because, due to the hydrophobicity of the material used for the floating solid, it is difficult to remove the bubbles from spongy floating solid, spongy floating solid float on the upper part of a biological reaction tank, the effects of membrane-cleaning are easily lost. In addition, it is easy for the surface of the spongy floating solid to become gradually covered with microbes, or with ex vivo substances thereof, and since these are too soft, the effects of scraping off deposits (a scale layer) adherent to a membrane surface can not be obtained. Further, when a membrane-cleaning particle having few asperities is used on a surface of the floating solid, a problem has arisen that the scraping off of deposits (scale layer) adherent to a membrane surface has not been performed effectively.

Patent Literature 1: Japanese Patent Application Laid-Open (JP-A) No. 1997-136021

SUMMARY OF THE INVENTION

Problems to Be Solved by the Invention

Accordingly, an object of the present invention is to solve the conventional problems described above and to provide a membrane-cleaning method for a membrane bioreactor process in which deposits adherent to the surface of a membrane used in a membrane bioreactor process can be effectively scraped off, and in which any deterioration in the rate of filtration through the filtration membrane can be avoided.

Means to Solve the Problems

A membrane-cleaning method for the membrane bioreactor process of the present invention which has been made in order to solve the above problems, is characterized in that membrane-cleaning particles of which a surface that makes contact with water to be treated are hydrophilized, and in which asperities of a surface that makes contact with a separation membrane element are not less than 100 μm and not more than 2500 μm, are introduced into a biological reaction tank with a separation membrane element submersed therein; that the membrane-cleaning particles are caused to flow by the air-lifting effects of bubbles ejected from an air diffuser, or by the effects of a stirring means, and that thereby, deposits adherent to the surface of the separation membrane element can be scraped off. In this invention, membrane-cleaning particles made of a non-pore or a closed-pore material may be used.

In addition, membrane-cleaning particles can be used that carry anti-bacterial component either on a surface that makes contact with water to be treated, or in the interior of the membrane-cleaning particle, and this antibacterial component can be either silver or copper. In addition, it is preferable that membrane-cleaning particles be periodically brought into an anaerobic condition and that microbes that exist on the surface of the particle be peeled off.

Effects of the Invention

According to the invention of claim 1, membrane-cleaning particles in which a surface that makes contact with water to be treated is hydrophilized, and asperities of a surface that makes contact with a separation membrane element are not less than 100 μm and not more than 2500 μm are caused to flow, and deposits choke up a surface of the separation membrane element is scrapped off. In addition, if bubbles are generated in the interior, since a surface that makes contact with water to be treated is hydrophilized, bubbles are rapidly removed. Further, since asperities of a surface that makes contact with the separation membrane element are made to be not less than 100 μm and not more than 2500 μm, deposits adherent to a surface of the separation membrane element can be effectively scraped off. As a result, deterioration in the rate of filtration of the separation membrane element through the membrane can be avoided. Further, when the particles are of a spongy network structure, the surface that makes contact with water to be treated, means in this context refers to a surface of a particle material.

According to the invention of claim 2, since a particle is made of a non-pore or a closed-pore material, the membrane-cleaning particle has no pore that communicates with the interior. Therefore, since bubbles are not generated in the interior, and do not float on an upper part of a biological reaction tank, the level of cleaning effects can be maintained. According to the invention of claim 3 or 4, since a membrane-cleaning particle is used that carries an antibacterial component such as silver and copper, it becomes difficult for microbes to become attached to a surface of the membrane-cleaning particle. For this reason, any deterioration in the level of scraping off effects caused by formation of a soft microbe membrane on the surface of the membrane-cleaning particle can be prevented. Further, according to the invention of claim 5, since a membrane-cleaning particle is brought into an anaerobic condition, and microbes on a particle surface are peeled off, any deterioration in the level of scraping off effects can be prevented. As a result, any deterioration in the rate of filtration of the separation membrane element through the membrane can be avoided.

EXPLANATION OF SYMBOLS

Figure 1:
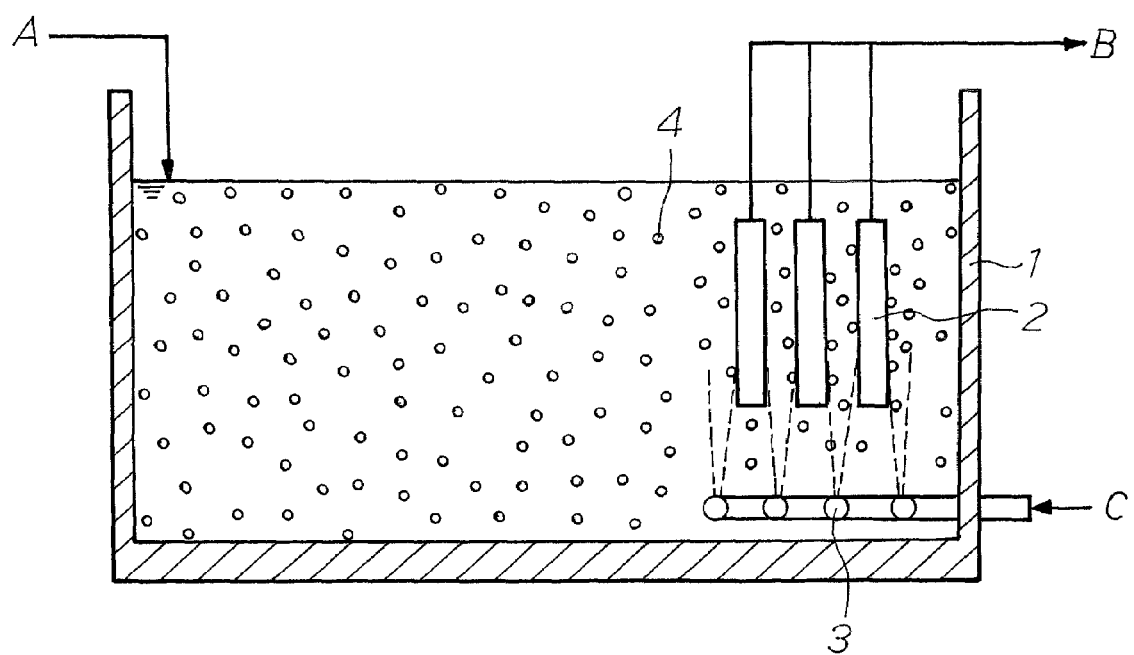
FIG. 1 is a cross-sectional view of an embodiment of the present invention.

1 Biological reaction tank
2 Separation membrane element
3 Air diffuser
4 Membrane-cleaning particle
A Raw water
B Treated water
C Air or gas

BEST MODE FOR CARRYING OUT THE INVENTION

FIG. 1 shows a preferable embodiment of the present invention. In the FIGURE, 1 is a biological reaction tank in which raw water A is biologically treated with the use of an activated sludge, and 2 is a separation membrane element which is submersed into the biological reaction tank 1 and takes out treated water B. This biological reaction tank 1 performs activated sludge treatment of a variety of wastewaters such as sewage, sidestreams, factory wastewater, leachate, night soil, agricultural wastewater, barn wastewater, and aquaculture wastewater, and can take out treated water B that has been clarified through the separation membrane element 2. As the biological reaction tank 1, methods can be used such as an aerobic method, an anaerobic method, Ludzack porcess, an AO method (anaerobic-oxic method), and an $A_2O$ method (anaerobic-anoxic-oxic method) Alternatively, a membrane separation basin may be provided independently of the biological reaction tank 1.

A filtration membrane constituting the separation membrane element 2 may be either a polymer membrane or a ceramic membrane, and a shape of the membrane may be any one of a monolith-type, a tubular-type, a honeycomb-type, and a flat membrane-type. Furthermore, the membrane may be either one of an external pressure-type and an internal pressure-type, and a shape of a cross-section thereof may be either round or polygonal. However, from the standpoints of size and cleanability, it is preferable to use a flat membrane-type polymer membrane or a ceramic membrane, as shown in the FIGURE.

When a tank in which the separation membrane element is provided is an aerobic tank, the air diffuser 3 is provided below the separation membrane element 2, and air or a gas C can thereby be supplied to the biological reaction tank 1. Due to the air-lifting effects of bubbles ejected from this air diffuser 3, a rising stream is generated around a surface of the separation membrane element 2 and deposits adherent to a membrane surface are removed. In order to further enhance these cleaning effects, the membrane-cleaning particle 4 is introduced into the biological reaction tank 1 in the present invention. In the case of an anaerobic tank, a fluid is caused to flow in the tank as the result of the fluidizing effects created by a fluidizing means such as natural fluidizing with a gas generated by either aeration, a stirrer, a water pump, or treatment.

The membrane-cleaning particle 4 used in the present invention has a specific gravity in water to be treated, of 0.9 to 2, whenever it is sufficiently submersed in water to be treated. Specifically, the particle is composed of a polymer material such as polyethylene, polypropylene, polyurethane, polystyrene, polyether sulfone, polyvinyl alcohol, cellulose acetate, polyacrylonitrile, chlorinated polyethylene, polyvinylidene fluoride, or polyvinyl fluoride, or an inorganic material such as a ceramic particle; and a closed pore is also desirable when foamed for adjusting a specific gravity. Thereby, bubbles are no longer generated in the interior of the membrane-cleaning particle 4, and the membrane-cleaning particle 4 does not float near the surface of water.

In addition, a surface of the membrane-cleaning particle 4 that makes contact with water to be treated is hydrophilized in advance by attaching a hydrophilic group such as a hydroxyl group (—OH), a carbonyl group (=CO), a carboxyl group (—COOH) or the like; or a hydrophilic substance such as a coupling agent such as a silane-based, a titanium-based, a chromium-based or a silyl peroxide-based coupling agent; a coating agent such as a silicone agent, an oxide such as alumina, silica, zirconia, titania; a clay compound, or a composite oxide such as zircone or the like. Thereby, even if a bubble is generated in the interior of the membrane-cleaning particle 4, it becomes easy for the bubble to escape into water. Therefore, the particle does not float as a result of a bubble in the interior, and in contrast to the conventional spongy membrane-cleaning particle, any loss in cleaning effects, is avoided. Further, as expressed in claim 2, when a particle consists of a non-pore or closed pore material, since it has no pore communicating with the interior from a surface, and there is no possibility that a bubble is generated in the interior, the particle does not float as a result of a bubble in the interior. Thus no loss in cleaning effects occurs, and this is preferable.

In addition, the membrane-cleaning particle 4 used in the present invention is made in advance in such a way as to have asperities of a surface that makes contact with the separation membrane element of not less than 100 μm and not more than 2500 μm. Asperities of a surface that makes contact with this separation membrane element can be measured with a microscope. When a membrane-cleaning particle which has a network structure, and into which water to be treated penetrates, like a sponge, is used, a pore diameter is not less than 100 μm and not more than 2500 μm. A membrane-cleaning particle 4 that has asperities of a surface that makes contact with the separation membrane element, of not less than 100 μm and not more than 2500 μm, is excellent in terms of cleaning effects. However, the shape itself of membrane-cleaning particle 4 has only a minor influence on the cleaning effects, and the shape may be either spherical or cubic. A size thereof is preferably around 5 to 10 mm in the case of a polymer material, and around 0.5 to 4 mm in the case of an inorganic material. In addition, when asperities are less than 100 μm, the effects of cleaning of the separation membrane element are low. On the other hand, when asperities exceed 2500 μm, a contact area between the membrane surface and the particle is small, and the level of cleaning effects is reduced.

In addition, as described in claim 3, a membrane-cleaning particle 4 that carries an antibacterial component either on a surface that makes contact with the separation membrane element, or within the interior of the membrane-cleaning particle, can be used. As an antibacterial component, many components that possess a capability of preventing the growth of a microbe are known, but since organic drugs are easily caused to flow off, and may have an adverse influence on an activated sludge, it is preferable to use a metal such as silver and copper. When a membrane-cleaning particle 4 that carries an antibacterial component either on a surface that makes contact with the separation membrane element or within the interior of the membrane like this is used, a soft microbial membrane is not formed on the surface of the membrane-cleaning particle, and any deterioration in scraping off effects can be prevented. Unless an entire particle is covered with a membrane of a microbe or a metabolite of a microbe, the effects of cleaning the separation membrane can be maintained.

It is preferable to provide a membrane-cleaning particle 4 of the type mentioned above in such a way that a volumetric ratio thereof becomes around 0.1 to 5% relative to the volume of the biological reaction tank 1. When the ratio is smaller than this, the cleaning effects are reduced and, when the ratio is increased so as to exceed this range, there is no improvement in the cleaning effects. As a result, any deterioration in the rate of filtration of the separation membrane element through the membrane, as used in the membrane bioreactor process, can be prevented.

As described above, in the invention of claims 3 and 4, adhesion of a microbial membrane was prevented by use of a membrane-cleaning particle 4 carrying an antibacterial component such as silver and copper, either on a surface that makes contact with the separation membrane element, or within the interior of the membrane cleaning particle, and, in the invention of claim 5, a microbe on a particle surface is peeled off by means of periodically bringing the membrane-cleaning particle 4 into an anaerobic condition. As a method of bringing the membrane-cleaning particle 4 into an anaerobic condition, a method may be used of removing the membrane-cleaning particle 4 from the biological reaction tank 1 and of introducing it into an anaerobic basin, or a method of periodically bringing the biological reaction tank 1 itself, or a part of the biological reaction tank 1, into an anaerobic condition. Since a microbial membrane formed on a surface of the membrane-cleaning particle 4 in an aerobic condition is easily peeled off by bringing the membrane-cleaning particle into the anaerobic condition, any deterioration in the scraping off effects of the membrane-cleaning particle 4 can be prevented.

EXAMPLE 1

In order to investigate the effects of the membrane-cleaning particle, a comparative experiment was performed with the use of two kinds of cubic particles (a hydrophilic polyurethane sponge and a hydrophobic polyurethane sponge). Hydrophilization of the hydrophilic polyurethane sponge was performed by means of treatment such that a surface that makes contact with water to be treated is covered with polyethylene glycol (hydrophilic). Asperities of a particle surface are 1.0 mm in both cases. As the biological reaction tank, an apparatus of a Ludzack process type consisting of a denitrogenated basin and a nitrification tank was used. As the separation membrane element, six polymer flat membranes having an effective area of 0.4 m² per membrane were submersed into a nitrification tank so as to obtain treated water. Leachate served as treatment wastewater. The membrane-cleaning particle was placed into the nitrification tank at a volumetric ratio of 0.7%. In addition, an operation was performed in the biological treatment tank at a MLSS (mixed liquor suspended solids) of 5000 mg/L. At the start of the experiment, a membrane filtration flux was initiated at 0.6 m/day, and a membrane filtration flux after four weeks was measured. Table 1 shows the results of a comparison of the membrane filtration flux. As shown in Table 1, when the hydrophilized polyurethane sponge was used, there was no deterioration in the membrane filtration flux, even after four weeks.

TABLE 1

| Membrane cleaning particle | Membrane filtration flux at the start of experiment | Membrane filtration flux after four weeks |
| --- | --- | --- |
| Hydrophilized polyurethane sponge | 0.6 m/day | 0.6 m/day |
| Hydrophobic polyurethane sponge | 0.6 m/day | 0.3 m/day |

EXAMPLE 2

In order to investigate the effects of the membrane-cleaning particle, a comparative experiment was performed with the use of five kinds of spherical particles (hydrophilic polyurethane sponge) that had varying level of asperities. Asperities of a particle surface were 50 μm, 100 μm, 1000 μm, 2500 μm, or 3000 μm. As the biological reaction tank, a Ludzack process-type apparatus consisting of a denitrogenated tank and a nitrification tank was used. As the separation membrane element, six polymer flat membranes having an effective area of 0.4 m² per membrane were submersed into a nitrification tank so as to obtain treated water. Sewage served as the treatment wastewater. The membrane-cleaning particle was introduced into the nitrification tank at a volumetric ratio of 0.7%. In addition, the operation was performed at an MLSS (mixed liquor suspended solids) of 5000 mg/L in the biological treatment tank. A membrane filtration flux was initiated at 0.8 m/day at the start of experiment, and a membrane filtration flux after four weeks was measured. Table 2 shows the results of a comparison of the membrane filtration flux. As shown in Table 2, when a hydrophilized polyurethane sponge was used that is within a numerical range of the present invention, no reduction occurred in the membrane filtration flux, even after four weeks.

TABLE 2

| Asperities of membrane-cleaning particle | Membrane filtration flux at start of experiment | Membrane filtration flux after four weeks |
| --- | --- | --- |
| 50 μm | 0.8 m/day | 0.6 m/day |
| 100 μm | 0.8 m/day | 0.8 m/day |
| 1000 μm | 0.8 m/day | 0.8 m/day |
| 2500 μm | 0.8 m/day | 0.8 m/day |
| 3000 μm | 0.8 m/day | 0.6 m/day |

The invention claimed is:

1. A method for cleaning a membrane in a membrane bioreactor process, comprising introducing a membrane-cleaning particle, in which a surface that makes contact with water to be treated is hydrophilized, and in which asperities of a surface that makes contact with a separation membrane element, are not less than 100 μm and not more than 2500 μm, into a biological reaction tank with a separation membrane element submersed therein, and by causing the membrane-cleaning particle to flow by means of air-lifting effects of bubbles ejected from an air diffuser, or by the effects of a fluidizing means, so as to scrape off deposits adherent to a surface of the separation membrane element.

2. The method for cleaning a membrane in a membrane bioreactor process according to claim 1, wherein a membrane-cleaning particle that consists of a non-pore, or of a closed pore material, is used.

3. The method for cleaning a membrane in a membrane bioreactor process according to claim 1, wherein a membrane-cleaning particle that carries an antibacterial component is used.

4. The method for cleaning a membrane in a membrane bioreactor process according to claim 3, wherein the antibacterial component is either silver or copper.

5. The method for cleaning a membrane in a membrane bioreactor process according to claim 1, wherein the membrane-cleaning particle is periodically brought into an anaerobic condition so to peel off a microbe on a surface of the particle.

* * * * *